United States Patent
Xiang et al.

(10) Patent No.: US 10,994,256 B2
(45) Date of Patent: May 4, 2021

(54) HIGH-THROUGHPUT COMBINATORIAL MATERIALS EXPERIMENTAL APPARATUS FOR IN-SITU SYNTHESIS AND REAL-TIME CHARACTERIZATION AND RELATED METHODS

(71) Applicants: NINGBO INFINITE MATERIALS TECHNOLOGY CO., LTD., Ningbo (CN); Xiaodong Xiang, Danville, CA (US)

(72) Inventors: Xiaodong Xiang, Danville, CA (US); Hong Wang, Shanghai (CN)

(73) Assignee: NINGBO INFINITE MATERIALS TECHNOLOGY CO., LTD., Ningbo (CN)

( * ) Notice: Subject to any disclaimer, the term of this patent is extended or adjusted under 35 U.S.C. 154(b) by 176 days.

(21) Appl. No.: 15/738,128

(22) PCT Filed: Jun. 22, 2016

(86) PCT No.: PCT/US2016/038832
§ 371 (c)(1),
(2) Date: Dec. 20, 2017

(87) PCT Pub. No.: WO2016/210010
PCT Pub. Date: Dec. 29, 2016

(65) Prior Publication Data
US 2018/0185810 A1    Jul. 5, 2018

Related U.S. Application Data

(60) Provisional application No. 62/183,588, filed on Jun. 23, 2015.

(51) Int. Cl.
*C40B 60/06* (2006.01)
*B01J 19/00* (2006.01)
*C40B 50/14* (2006.01)

(52) U.S. Cl.
CPC .......... *B01J 19/0046* (2013.01); *C40B 50/14* (2013.01); *C40B 60/06* (2013.01);
(Continued)

(58) Field of Classification Search
None
See application file for complete search history.

(56) References Cited

U.S. PATENT DOCUMENTS 6,013,199 A    1/2000  McFarland et al.
6,045,671 A    4/2000  Wu et al.
(Continued)

OTHER PUBLICATIONS

International Search Report in the parent PCT application No. PCT/US2016/038832, dated Sep. 13, 2016.
(Continued)

*Primary Examiner* — Paul S Hyun
(74) *Attorney, Agent, or Firm* — Chen Yoshimura LLP

(57) ABSTRACT

A high-throughput combinatorial materials experimental apparatus for in-situ synthesis and real-time characterization includes a composition spread device to prepare continuous or discrete composition distribution as precursor of the high-throughput experimental samples library, a low temperature diffusion mixing device to thoroughly mix the composition spread in the thickness direction through diffusion at a relatively low temperature to form an amorphous precursor, and an integrated synthesis-characterization unit for heat treatment of the material library precursor in either a parallel or point-by-point scanning mode at different thermodynamic conditions for phase formation and to characterize features or properties of the materials of interest in an in-situ and real-time manner. The integrated synthesis-characterization unit includes a chamber maintained at desired vacuum and atmosphere, a micro-heating source, an excitation source, a signal collector, and a sample holder.

14 Claims, 7 Drawing Sheets

(52) U.S. Cl.
CPC ............... *B01J 2219/0043* (2013.01); *B01J 2219/00441* (2013.01); *B01J 2219/00443* (2013.01); *B01J 2219/00479* (2013.01); *B01J 2219/00495* (2013.01); *B01J 2219/00585* (2013.01); *B01J 2219/00587* (2013.01); *B01J 2219/00596* (2013.01); *B01J 2219/00603* (2013.01); *B01J 2219/00675* (2013.01); *B01J 2219/00686* (2013.01); *B01J 2219/00704* (2013.01); *B01J 2219/00745* (2013.01); *B01J 2219/00756* (2013.01)

(56) References Cited

U.S. PATENT DOCUMENTS

| | | |
|---|---|---|
| 6,911,129 B1 | 6/2005 | Li |
| 2005/0150463 A1 | 7/2005 | He et al. |
| 2007/0269611 A1 | 11/2007 | Xiang et al. |
| 2008/0076679 A1 | 3/2008 | Shan et al. |
| 2010/0120636 A1* | 5/2010 | Prewer .............. B01J 19/0046 506/30 |
| 2013/0136862 A1 | 5/2013 | Satitpunwaycha |

OTHER PUBLICATIONS

IPRP in the parent PCT application No. PCT/US2016/038832, dated Dec. 26, 2017.
Xiang, "Combinatorial materials synthesis and screening: an integrated materials chip approach to discovery and optimization of functional materials", Annual Review of Materials Science. 1999, vol. 29, No. 1, pp. 149-171.
Yoo et al., "Identification of amorphous phases in the Fe—Ni—Co ternary alloy system using continuous phase diagram material chips", Intermetallics, 2006, 14, pp. 241-247.
Isaacs et al., "Synchrotron x-ray microbeam diagnostics of combinatorial synthesis", Applied Physics Letters, Sep. 28, 1998, vol. 73, No. 13, pp. 1820-1822.
Xiang et al., "Individualized Pixel Synthesis and Characterization of Combinatorial Materials Chips", Engineering 2015, 1(2), pp. 225-233.
Basov et al., "Electrodynamics of high-Tc superconductors", Reviews of Modern Physics, Apr. 2005, vol. 77, pp. 721-779.
Huang et al., "Angle-resolved photoemission studies of the superconducting gap symmetry in Fe-based superconductors", 2012, AIP Advances 2, pp. 041409-1-041409-8.
Brown et al., "Following the electroreduction of uranium dioxide to uranium in LiCI—KCl eutectic in situ using synchrotron radiation", Journal of Nuclear Materials, 2015, 464, pp. 256-262.
Fish, "Soft Magnetic Materials", Proceedings of the IEEE, Jun. 1990, vol. 78, No. 6, pp. 947-972.
Pollock et al., "Nickel-Based Superalloys for Advanced Turbine Engines: Chemistry, Microstructure, and Properties", Mar.-Apr. 2006, Journal of Propulsion and Power, vol. 22, No. 2, pp. 361-374.
Tedenac, "Cobalt—Iron—Nickel", 2008, Materials Science and International Team, MSIT, In: Effenberg G., Ilyenko S. (eds) Iron Systems, Part 2. Landolt-Börnstein—Group IV Physical Chemistry (Numerical Data and Functional Relationships in Science and Technology), vol. 11D2. Springer, Berlin, Heidelberg, pp. 1-20.
Wuttig et al., "Phase-change materials for rewriteable data storage", Nature Materials, Nov. 2007, vol. 6, pp. 824-832.
Xiang et al., "A Combinatorial Approach to Materials Discovery", Science, Jun. 23, 1995, vol. 268, (5218), pp, 1738-1740.
Green et al., "Applications of high throughput (combinatorial) methodologies to electronic, magnetic, optical, and energy-related materials", J. Appl. Phys., 2013, 113, 231101-1-231101-53.
Potyrailo et al., "Combinatorial and High-Throughput Development of Sensing Materials: The First 10 Years", Chemical Reviews, 2008, vol. 108, No. 2, pp. 770-813.
Mao et al., "High throughput growth and characterization of thin film materials", Journal of Crystal Growth, 2013, 379, pp. 123-130.
Chen et al., "Combinatorial Synthesis of Insoluble Oxide Library from Ultrafine/Nano Particle Suspension Using a Drop-on-Demand Inkjet Delivery System", Journal of Combinatorial Chemistry, 2004, vol. 6, No. 5, pp. 699-702.
Zhao et al., "A Diffusion Multiple Approach for the Accelerated Design of Structural Materials", MRS Bulletin, Apr. 2002, 27(04), pp. 324-329.
Montgomery et al., "High-Throughput Discovery of New Chemical Reactions", Chemistry., Science, Sep. 9, 2011, vol. 333, pp. 1387-1388.
Gregoire et al., "Cosputtered composition-spread reproducibility established by high-throughput x-ray fluorescence", J. Vac. Sci. Technol., Sep./Oct. 2010, A, 28(5), pp. 1279-1280.
Gregoire et al , "High energy x-ray diffraction/x-ray fluorescence spectroscopy for high-throughput analysis of composition spread thin films", Review of Scientific Instruments, 2009, 80, pp. 123905-1-123905-6.
Reddington et al., "Combinatorial Electrochemistry: A Highly Parallel, Optical Screening Method for Discovery of Better Electrocatalysts", Science, Jun. 12, 1998, vol. 280, pp. 1735-1737.
Liu et al. "Inkjet Printing Assisted Synthesis of Multicomponent Mesoporous Metal Oxides for Ultrafast Catalyst Exploration", Nano Letters, 2012, 12, pp. 5733-5739.
Wei et al, "Scanning tip microwave nearfield microscope", Applied Physics Letters, Jun. 10, 1996, 68(24), pp. 3506-3508.
Oral et al., "Scanning Hall probe microscopy of superconductors and magnetic materials", Journal of Vacuum Science & Technology, Mar./Apr. 1996, B 14(2), pp. 1202-1205.
Takeuchi et al., "Monolithic multichannel ultraviolet detector arrays and continuous phase evolution in Mg x Zn 1-x O composition spreads", Journal of Applied Physics, Dec. 1, 2003, vol. 94, No. 11, : 7336-7340.
Huxtable et al., "Thermal conductivity imaging at micrometre-scale resolution for combinatorial studies of materials", Nature materials, May 2004, vol. 3, pp. 298-301.
Kim et al., "High-throughput analysis of thin-film stresses using arrays of micromachined cantilever beams", Review of Scientific Instruments, 2008, vol. 79, 045112-1-045112-7.
Allibert et al., "Co—Cr binary system: experimental re-determination of the phase diagram and comparison with the diagram calculated from the thermodynamic data", Journal of the Less Common Metals, Jun. 1978, vol. 59, Issue 2, pp. 211-228.
Ishida et al., "The Co—Cr (Cobalt—Chromium) system", Bulletin of Alloy Phase Diagrams, 1990, vol. 11, No. 4, pp. 357-370.
Nishizawa et al., "The Co—Fe (Cobalt—Iron) System", Bulletin of Alloy Phase Diagrams, 1984, vol. 5, No. 3, pp. 250-259.
Raghavan, "Co—Fe—Ni (Cobalt—Iron—Nickel)", Journal of Phase Equilibria, 1994, vol. 15, No. 5, pp. 526-527.

* cited by examiner

HIGH-THROUGHPUT COMBINATORIAL MATERIALS EXPERIMENTAL APPARATUS FOR IN-SITU SYNTHESIS AND REAL-TIME CHARACTERIZATION AND RELATED METHODS

BACKGROUND OF THE INVENTION

Field of the Invention

The present invention relates to a high-throughput combinatorial materials experimental apparatus in the field of scientific instruments and equipment, particularly a high-throughput combinatorial materials experimental apparatus integrating serial in-situ material synthesis and real-time characterization, and related methods.

Description of Related Art

Establishing the systematic relationships between materials composition-structure-synthesis parameter-property, which are in general presented as "phase diagrams", is one of the central tasks of materials science and engineering, and remains a great challenge. Conventional materials research methodology, characterized by synthesizing and characterizing one sample at a time, is costly, time-consuming, unsystematic, and, given these disadvantages, insufficient for the current era of accelerating technology. Meanwhile, combinatorial materials chip technology, featuring high-throughput synthesis and the characterization of materials libraries containing $10^2$-$10^4$ samples on one small substrate in a short period of time [see, for example, X. D. Xiang, et al., Science, 1995, 268(5218): 1738-1740], has demonstrated great potential to break through the existing bottleneck. Over the past two decades, high-throughput experimental technologies have undergone rapid progress [see, for example, M. L. Green, I. Takeuchi, J. R. Hattrick-Simpers. J. Appl. Phys., 2013, 113(23): 231101; R. A. Potyrailo, V. M. Mirsky, Chem. Rev., 2008, 108(2): 770-813]. A wide range of techniques and related instruments has been developed for synthesizing materials libraries of various forms (thin film, powder, bulk, liquid, etc.) and characterizing composition, structure, and electrochemical, catalytic, electromagnetic, magnetic, optical, thermal, and mechanical properties. See, generally, S. S. Mao. J. Cryst. Growth, 2013, 379: 123-130; L. Chen, J. Bao, C. Gao, S. Huang, C. Liu, W. Liu., J. Comb. Chem., 2004, 6(5): 699-702; J. C. Zhao, M. R. Jackson, L. A. Peluso, M R S Bull., 2002, 27(04): 324-329; J. Montgomery. Chemistry., Science, 2011, 333(6048): 1387-1388; J. M. Gregoire, D. Dale, A. Kazimirov, F. J. DiSalvo, R. B. van Dover., J. Vac. Sci. Technol. A, 2010, 28(5): 1279-1280; J. M. Gregoire etc., Rev. Sci. Instrum., 2009, 80(12): 123905; E. Reddington et al., Science, 1998, 280(5370): 1735-1737; X. Liu, et al. Nano Lett., 2012, 12(11):5733-5739; T. Wei, et al, Appl. Phys. Lett., 1996, 68(24): 3506-3508; A. Oral, et al., J. Vac. Sci. Technol. B, 1996, 14(2): 1202-1205; I. Takeuchi, et al., J. Appl. Phys., 2003, 94(11): 7336-7340; S. Huxtable, et al, Nat. Mater., 2004, 3(5): 298-301; H. J. Kim, et al., Rev. Sci. Instrum., 2008, 79(4): 045112.

Take the ternary equilibrium phase diagram as an example. Conventionally, an experimentally determined phase diagram requires studies of phase formation at a range of temperatures for each composition and the compilation of data in order to draw the phase boundaries in a 3-D space with a horizontal composition map and a vertical temperature axis. Often, a collection of thousands of experiments is needed, which typically takes years of effort from multiple research groups [see, for example, C. Allibert, et al., J. Less Common Met., 1978, 59(2): 211-228; K. Ishida, et al., Bull. Alloy Phase Diagr., 1990, 11(4): 357-370; T. Nishizawa, et al., Bull. Alloy Phase Diagr., 1984, 5(3): 250-259; V. Raghavan. Co—Fe—Ni (cobalt-iron-nickel). J. Phase Equilibria, 1994, 15(5): 526-527]. In contrast, a study of one temperature section of the ternary phase diagram of Fe—Co—Ni using the materials chip method may be completed within a few days. See, for example, Y. K. Yoo, et al. Intermetallics, 2006, 14(3): 241-247. In this study, an equilateral-triangle-shaped thin-film materials library covering the whole range of Fe—Co—Ni compositions was annealed at 600° C. under a $10^{-8}$ Torr vacuum for 3 h. Structural phases were identified and the phase diagram was obtained. This diagram agreed quite well with the reported phase diagrams constructed by conventional methods at this temperature, except that two new amorphous regions not included in the existing phase diagram were identified for the first time. Thus, the benefits of the high-throughput experiment approach are clearly shown.

However, significant limitations still exist in current high-throughput experimental techniques. In particular, the whole materials library is usually processed in parallel, that is, under the same thermal conditions. Thus, with current techniques, although a materials library can cover the entire composition spread with better than 1% resolution (the equivalent of ~5000 compositions), only one isothermal section of the phase diagram can be mapped in one experiment, for example, in the 600° C. isothermal section of the Fe—Co—Ni phase diagram [Y. K. Yoo, et al. Intermetallics, 2006, 14(3): 241-247]. High-temperature phases such as δ-Fe, which is only formed at 1394° C. and is stable up to 1538° C. in the Fe—Co alloy system, cannot be studied using the same chip. To map the temperature range of this Fe—Co alloy system at a 10° C. interval, 120 materials libraries and about 2 year time would still be required (assumption based on one isothermal section per week).

In addition, for the current technology, the synthesis and characterization can only be conducted separately in the experiment [see, for example, Y. K. Yoo, et. al., Intermetallics, 14, 241(2006)]. For example, to obtain 600° C. isothermal section of the Fe—Co—Ni phase diagram, structure and composition on each material pixel were determined by synchrotron based XRD (X-ray diffraction) and XRF (X-ray fluorescence) after the material chip was heat treated as a whole [see, for example, E. D. Isaacs, M. Marcus, X.-D. Xiang et al., APL, 73, 1820 (1998)]. The ex-situ nature of characterization basically prohibits the kinetic data from being measured continuously.

Furthermore, since the whole materials chip including the substrate is processed in parallel, the thermal mass is so large that cooling cannot be fast enough to freeze the microstructure exactly at that of the processing temperature. This poses a particular problem for the melted material for which a crystalline rather than an amorphous phase might be resulted, which mistakenly suggests the temperature is still below the melting point.

Therefore, for more efficient mapping of a complete phase diagram using the materials-library approach, each pixel needs to be individually processed step by step by a progressive heat-treatment procedure while the phase evolution on the pixel is monitored in situ in real time. The same procedure is then repeated pixel by pixel on the whole chip.

This way, only one combinatorial materials library is required [Xiang et al., Engineering, 1(2) 225-233, 2015].

SUMMARY

In response to the limitations mentioned above, the present invention provides a high-throughput combinatorial materials experimental apparatus for in-situ synthesis and real-time characterization, and a related method, mainly to solve the following three technical problems:

(1) individualized synthesis at different thermodynamic conditions for in-situ phase formation;

(2) real-time characterization and testing of micro-scale composition, structure, phase and service performance; and (3) rapid feedback of characterization results to control phase formation conditions.

One aspect of the present invention provides a high-throughput combinatorial materials experimental apparatus for in-situ synthesis and real-time characterization, which includes: a composition spread device for preparing a continuously graded or discrete composition spread containing a plurality of samples located at a plurality of locations on a plane; a low temperature diffusion mixing device for mixing the composition spread in a direction perpendicular to the plane by diffusion at a predetermined temperature to form an amorphous mixture; and an integrated synthesis-characterization unit for heat treatment of the samples of the composition spread in a parallel or point-by-point scanning mode at different thermodynamic conditions for phase formation, while characterizing properties of the samples in an in-situ and real-time manner.

Preferably, the integrated synthesis-characterization unit includes: a chamber; a gas inlet and a vent provided on the chamber, and a vacuum pump connected to the vent for producing a designed vacuum and atmosphere in the chamber; a chamber instrument module for monitoring the vacuum and atmosphere in the chamber; a sample holder disposed in the chamber for holding the composition spread; a micro-heating source for heating a selected sample at a selected location of the composition spread located in the chamber; an excitation source for providing excitation to the selected sample while the selected sample is being heated; a signal collector for collecting characterization signals generated by the selected sample while the selected sample is heated and excited; wherein the sample holder, the micro-heating source, the excitation source and the signal collector are controlled to cooperate with each other to achieve discrete heat treatment of each sample individually and the plurality of samples sequentially for phase formation and to collect and record characterization signals from each sample while under heat treatment.

Preferably, the signal collector and the micro-heating source form a feedback control loop for real-time feedback and control of thermodynamic conditions of the selected sample based on the characterization signals collected by the signal collector.

In some embodiments, the sample holder includes a displacement platform which provides controllable movements in at least two directions in the plane of the samples, wherein the micro-heating source, the excitation source and the signal collector align with a point in the plane of the samples placed on the sample holder. In some other embodiments, the sample holder is stationary, wherein the apparatus further comprises a micro-heating source tracking controller, an excitation source tracking controller and a signal collector tracking controller for respectively controlling alignment of the micro-heating source, the excitation source and the signal collector to simultaneously align at a selected location in the plane of the samples and to move the selected location sequentially to scan all samples of the composition spread.

In another aspect, the present invention provides a method for in-situ synthesis and real-time characterization using the above apparatus, the method including:

Step 1: Forming a composition spread in the composition spread device based on a predetermined material design, the composition spread containing a plurality of samples located at a plurality of locations on a plane;

Step 2: Transferring the composition spread from the composition spread device to the low temperature diffusion mixing device using the sample transfer device, selecting a thermodynamic temperature/thickness window according to a diffusion coefficient and a thickness of the samples, and heating the composition spread based on the selected thermodynamic temperature/thickness window to form a homogeneous amorphous mixture of the composition spread through diffusion;

Step 3: Transferring the composition spread from the low temperature diffusion mixing device to the integrated synthesis-characterization unit using the sample transfer device, and adjusting a location of the sample holder and/or the micro-heating source, the excitation source and the signal collector to align the micro-heating source, the excitation source and the signal collector with a selected one of the plurality of samples of the composition spread;

Step 4: Operating the micro-heating source to heat the selected sample while operating the excitation source and the signal collector to detect an evolution of one or more properties of the selected sample during heat treatment and phase formation, the one or more properties including one or more of physical and chemical properties or service performance of interest, and continuing to operate the micro-heating source, the excitation source and the signal collector until one or more predetermined conditions of the selected sample are met; and Step 5: After the one or more predetermined conditions of the selected sample are met, re-aligning the micro-heating source, the excitation source and the signal collector with another selected one of the plurality of samples and repeating Step 4, until all of the plurality of samples are processed.

Embodiments of the present invention have the following features and advantages:

(1) The embodiments utilize a tunable pulsed infrared laser beam for micro-heating of samples and fabricate discrete or micro-scale high-throughput experimental samples at different thermodynamic conditions, and can effectively synthesizes material systems with very different thermodynamic phase formation conditions, thus significantly enhancing the universality of the materials systems.

(2) The existing high-throughput synthesis and characterization techniques can only achieve composition spread in one high-throughput experimental sample, while embodiments of the present invention have the function of phase formation at different thermodynamic conditions, so a combination of process conditions, such as synthesis temperature, time and atmosphere, can be further achieved in one high-throughput experimental sample.

(3) The present invention achieves in-situ, real-time and rapid characterization of micro-scale composition, structure, phase and service performance using large scientific facilities (such as synchrotron radiation and spallation neutron sources) and simulation of a wide range of service conditions (such as temperature and external force) using the tunable pulsed laser and MEMS substrate, thus achieving in-situ and real-time observation and characterization of the response and structural changes of the materials during service. In addition, as the sources of large scientific facilities have excellent penetration, they have promising applicability in service performance testing of complex workpieces.

(4) The present invention integrates the following three technical elements: phase formation at different thermodynamic conditions; in-situ, real-time and rapid characterization of micro-scale composition, structure, phase and service performance; and real-time identification of characterization results and quick feedback and control of phase formation conditions. Thus, during the preparation of materials samples, the composition, structure, phase and service performance can be characterized and detected in an in-situ and real-time manner, and the impact of process parameters on the composition, structure and service performance can be examined, thus constructing a complete process-composition-structure-property phase diagram including temperature, time, atmosphere and other thermodynamic process parameters.

DETAILED DESCRIPTION OF PREFERRED EMBODIMENTS

According to embodiments of the present invention, a high-throughput combinatorial materials experimental apparatus for in-situ synthesis and real-time characterization includes: a composition spread device to prepare the desired continuous or discrete composition distribution as designed for the precursor of the high-throughput experimental samples library; a low temperature diffusion mixing device to thoroughly mix the composition spread in the thickness direction through diffusion at a relatively low temperature to form an amorphous precursor; and an integrated synthesis-characterization unit, which is used for heat treatment of the material library precursor in either a parallel or point-by-point scanning mode at different thermodynamic conditions for phase formation, and to characterize the features or properties of the materials of interest in an in-situ and real-time manner.

Figure 1:
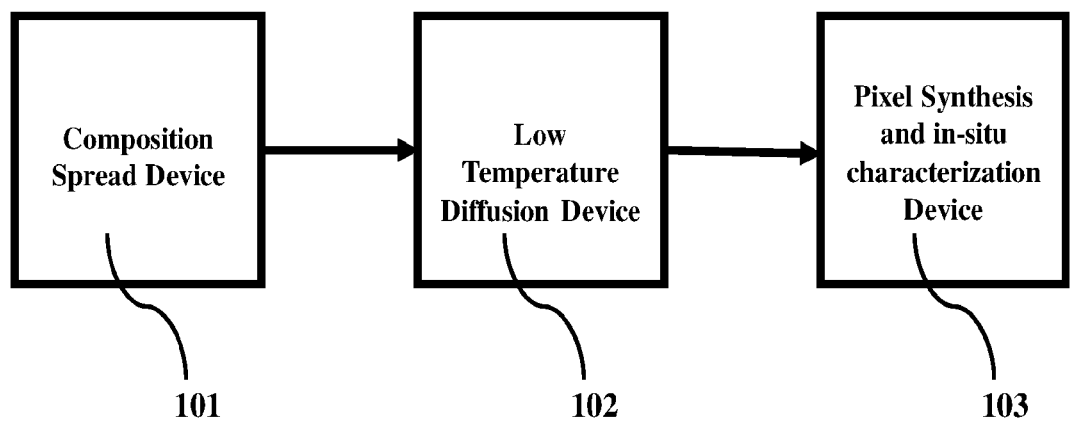
FIG. 1 is a schematic illustration of system components of a high-throughput combinatorial materials experimental apparatus for in-situ synthesis and real-time characterization according to embodiments of the present invention.

As illustrated in FIG. 1, the composition spread device (101), low-temperature diffusion mixing device (102) and the integrated synthesis-characterization unit (103) are connected in turn, and the high-throughput experimental samples pass through them sequentially.

Specifically, in the high-throughput combinatorial materials experimental apparatus for in-situ synthesis and real-time characterization, the composition spread device, depending on the features of the materials systems and the design of the high-throughput experiments, may be a high-throughput combinatorial materials composition spread device based on physical vapor deposition, chemical vapor deposition, inkjet printing, laser additive manufacturing or non-vacuum atomization spray.

Specifically, in the high-throughput combinatorial materials experimental apparatus for in-situ synthesis and real-time characterization, to achieve low temperature diffusion thermodynamic conditions, the heating method of the low temperature diffusion mixing device may be radiation heating, hot plate heating or resistance wire- or $MoSi_2$-based atmosphere heating or other alternative heating methods that can provide low temperature diffusion thermodynamic conditions.

Preferably, in the high-throughput combinatorial materials experimental apparatus for in-situ synthesis and real-time characterization, the low temperature diffusion mixing device includes a feedback temperature control system for heat treatment of the materials.

Preferably, in the high-throughput combinatorial materials experimental apparatus for in-situ synthesis and real-time characterization, the low temperature diffusion mixing device includes a vacuum-tight chamber, where the low temperature diffusion process of the high-throughput experimental samples is performed.

Specifically, in the low temperature diffusion mixing device, the vacuum-tight chamber may be a chamber of low vacuum, high vacuum, ultra-high vacuum or other atmosphere depending on the design of the high-throughput experiments.

Preferably, in the high-throughput combinatorial materials experimental apparatus for in-situ synthesis and real-time characterization, the functions of the low temperature diffusion mixing device can be integrated into the composition spread device or the integrated synthesis-characterization unit, thus combining the low temperature diffusion mixing device and the composition spread device or the integrated synthesis-characterization unit into one unit.

Specifically, in the high-throughput combinatorial materials experimental apparatus for in-situ synthesis and real-time characterization, the integrated synthesis-characterization unit comprises:

a chamber to provide the venue and environment for serial in-situ synthesis and real-time characterization;

a gas inlet, a vent, and a vacuum pump connected to the vent to create the required vacuum and atmosphere in the chamber;

a chamber instrument module to monitor the vacuum and atmosphere in the chamber;

a sample holder to hold the high-throughput experimental samples in the chamber;

a micro-heating source to achieve serial synthesis of the samples in the high-throughput library;

an excitation source to provide appropriate excitation and interactions between materials samples; and a signal collector to collect characterization signals generated upon the excitation of materials samples.

The sample holder, micro-heating source, excitation source and signal collector work together to achieve stand-alone heat treatment of micro-scale or discrete samples for phase formation and to track and characterize the samples under heat treatment.

Specifically, in the integrated synthesis-characterization unit, the shape of the chamber (201, 301, 401, 501 and 601 in FIG. 2 through FIG. 6) may be flexibly selected according to the design of the specific unit.

Specifically, in the integrated synthesis-characterization unit, the gas inlet (202, 302, 402, 502 and 602 in FIG. 2 through FIG. 6) may be flexibly located.

Preferably, in the integrated synthesis-characterization unit, there may be one or more gas inlets to obtain a mixture of several gases.

Specifically, in the integrated synthesis-characterization unit, the vent (205, 305, 405, 505 and 605 in FIG. 2 through FIG. 6) may be flexibly located.

Specifically, in the integrated synthesis-characterization unit, the vacuum pump (206, 306, 406, 506 and 606 in FIG. 2 through FIG. 6) is connected to the vent.

Preferably, in the integrated synthesis-characterization unit, the vacuum pump may consist of a two-stage vacuum pump, the first stage of which may be a molecular pump, ion pump, condensation pump or adsorption pump and the second stage of which may be a mechanical pump.

Specifically, in the integrated synthesis-characterization unit, the chamber instrument module (204, 304, 404, 504 and 604 in FIG. 2 through FIG. 6) consists of a vacuum gauge and a mass spectrometer to monitor the vacuum and atmosphere in the chamber (201 through 601).

Preferably, in the chamber instrument module, the vacuum gauge may be a composite resistance-ionization vacuum gauge.

Preferably, in the chamber instrument module, the mass spectrometer may be a quadrupole mass spectrometer.

Specifically, in the integrated synthesis-characterization unit, the heating method of the micro-heating source may be, without limitation, laser heating or electron beam heating.

Preferably, in the integrated synthesis-characterization unit, the micro-heating source may be a tunable pulsed laser source to achieve the control over thermodynamic phase formation conditions.

Specifically, in the integrated synthesis-characterization unit, the heating temperature of the heated region can be calculated based on the duty cycle, power density and spot size of the tunable pulsed laser emitted and the convection and radiation heat transfer efficiency of the samples, heat capacity of materials, and phase transition enthalpy.

Optionally, in the integrated synthesis-characterization unit, the temperature of the heated region can be measured using additional infrared temperature measuring components of the micro-heating source.

Optionally, in the integrated synthesis-characterization unit, the micro-heating source (203, 403, 503 and 603 in FIG. 2, FIG. 4, FIG. 5 and FIG. 6) may be located inside the chamber (201, 401, 501 and 601), or the micro-heating source (303 in FIG. 3) may be located outside the chamber (301) by providing a heating source window (311) in the chamber (301) in alignment with the heating source (303).

Specifically, in the integrated synthesis-characterization unit, the excitation source (210, 310 and 610 in FIG. 2, FIG. 3 and FIG. 6) may be, without limitation, microwave, THz wave, infrared light, visible light, ultraviolet light, deep ultraviolet light, soft X-ray, electron, spallation neutron, laser as well as a light source with continuous wide spectrum, such as synchrotron radiation source.

Optionally, in the integrated synthesis-characterization unit, the excitation source (210 and 610 in FIG. 2 and FIG. 6) may be located inside the chamber (201 and 601), or the excitation source (310 in FIG. 3) may be located outside the chamber (301) by providing an excitation source window (313) in the chamber (301) which is in alignment with the excitation source (310) and made of appropriate materials according to the wavelength range of the excitation source.

Specifically, in the integrated synthesis-characterization unit, the signal collector (207, 307 and 607 in FIG. 2, FIG. 3 and FIG. 6) is a detector appropriately selected according to the characteristics of the characterization data generated after the samples are excited by the excitation source (210, 310 and 610), including but not limited to various spectrometers of different bands, Raman spectrometer, neutron detector, electronic detector, energy-resolved X-ray counter, wavelength-resolved X-ray counter, and fluorescence spectrometer.

Optionally, in the integrated synthesis-characterization unit, the signal collector (207 and 607 in FIG. 2 and FIG. 6) may be located inside the chamber (201 and 601), or the signal collector (307 in FIG. 3) may be located outside the chamber (301) by providing a signal collector window (312) in the chamber (301) which is in alignment with the signal collector (307) and made of appropriate materials according to the wavelength range of characterization signals generated under the action of the excitation source.

Specifically, in the integrated synthesis-characterization unit, the signal collector (407 and 507 in FIG. 4 and FIG. 5) may be a probe, which collects characterization data while interacting with the samples.

Specifically, in the integrated synthesis-characterization unit, the high-throughput experimental samples (209, 309, 409, 509 and 609 in FIG. 2 through FIG. 6) may be a continuous composition spreading or a discrete combinatorial material samples library or sample workpieces.

Preferably, in the integrated synthesis-characterization unit, the high-throughput experimental samples may be fabricated on a MEMS (microelectromechanical system) substrate, wherein active components can be constructed as a heater for the samples or a test setup for some material properties.

Specifically, in the integrated synthesis-characterization unit, the sample holder (208, 308, 408, 508 and 608 in FIG. 2 through FIG. 6) may be a fixed or X-Y 2D or X-Y-Z 3D displacement platform.

Preferably, in the integrated synthesis-characterization unit, the sample holder may be provided with a programmable heating module, an electric field source, a magnetic field source, etc.

Figure 2:
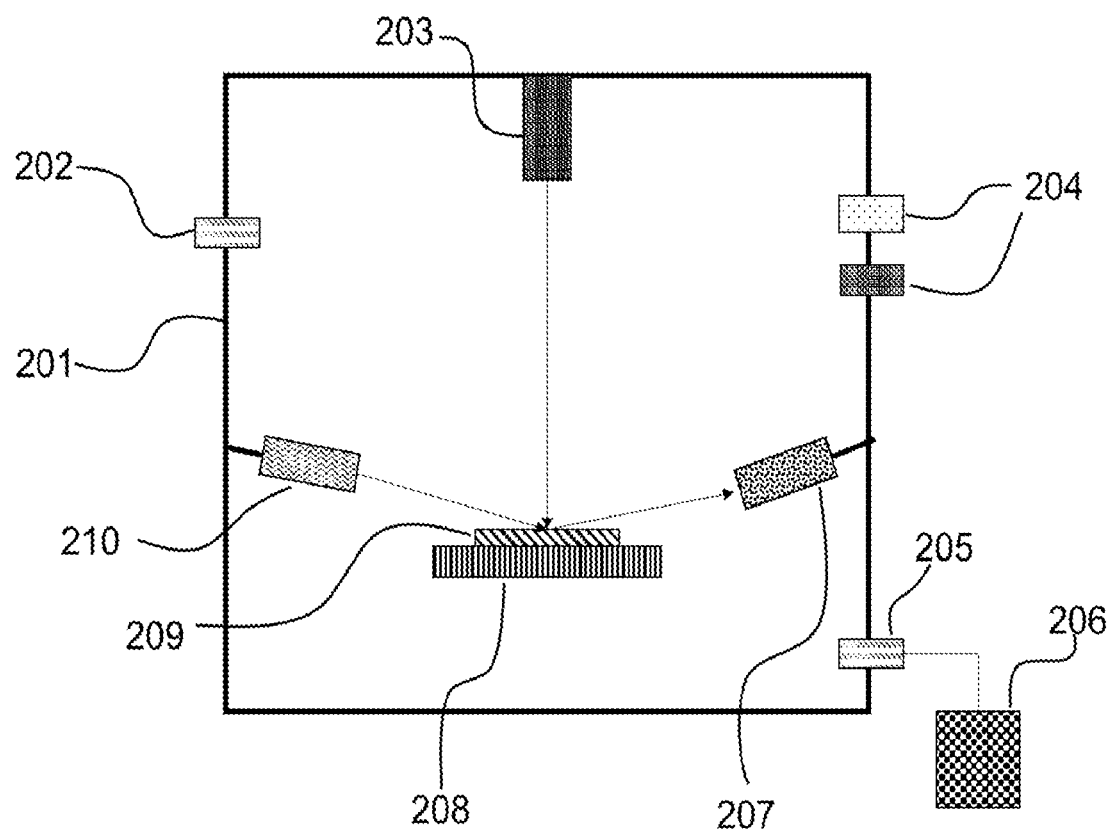
FIG. 2 is a schematic illustration of an integrated synthesis-characterization unit of the apparatus according to an embodiment of the present invention.
Figure 3:
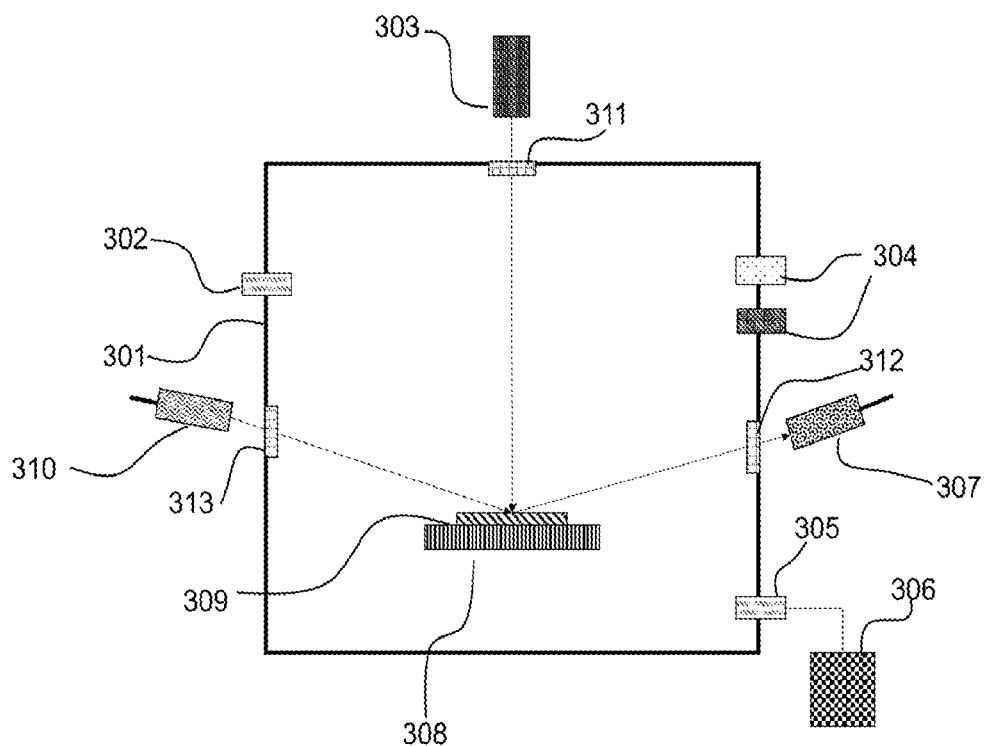
FIG. 3 is a schematic illustration of the integrated synthesis-characterization unit according to an alternative embodiment of the present invention.
Figure 4:
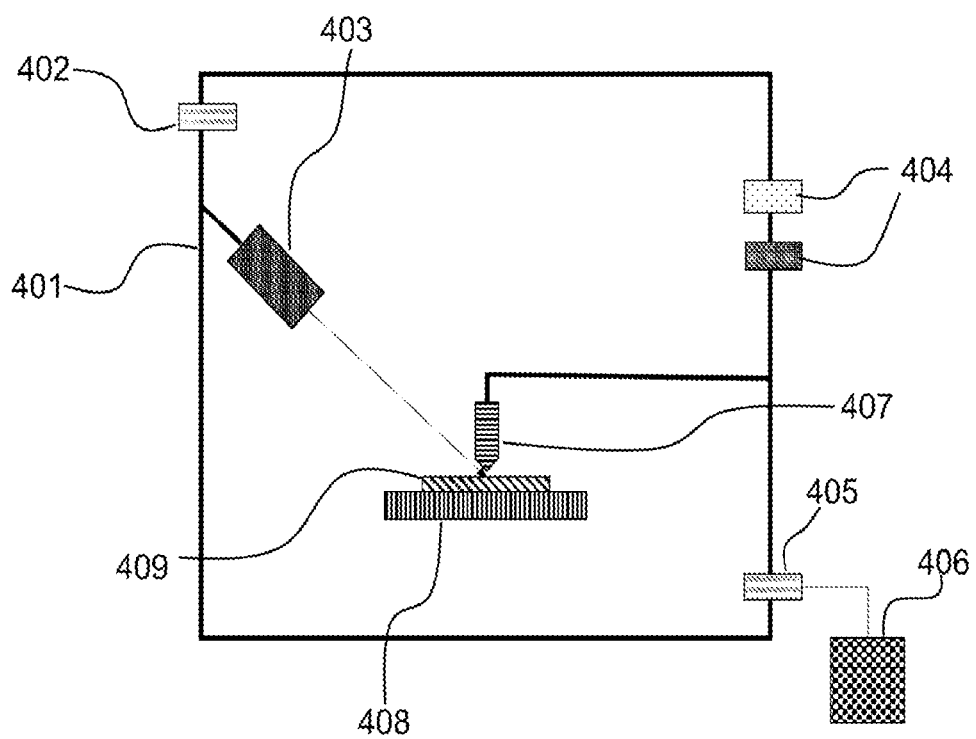
FIG. 4 is a schematic illustration of the integrated synthesis-characterization unit according to an alternative embodiment of the present invention.

In some embodiments, in the integrated synthesis-characterization unit, the discrete heat treatment of micro-scale or serially-synthesized samples in the high-throughput experimental samples library and the tracking and characterization of the samples under heat treatment are as shown in FIG. 2, FIG. 3 and FIG. 4: the micro-heating source (203, 303 and 403), the excitation source (210 and 310) and the signal collector (207, 307 and 407) align with a point in the plane of the high-throughput experimental sample (209, 309 and 409); the sample holder (208, 308 and 408) is an X-Y 2D or X-Y-Z 3D displacement platform and moves in the X-Y plane from point to point; the micro-heating source performs discrete heat treatment to the micro-scale high-throughput samples; meanwhile, the excitation source and the signal collector complete the characterization of the micro-scale or serially-synthesized samples under heat treatment.

Figure 5:
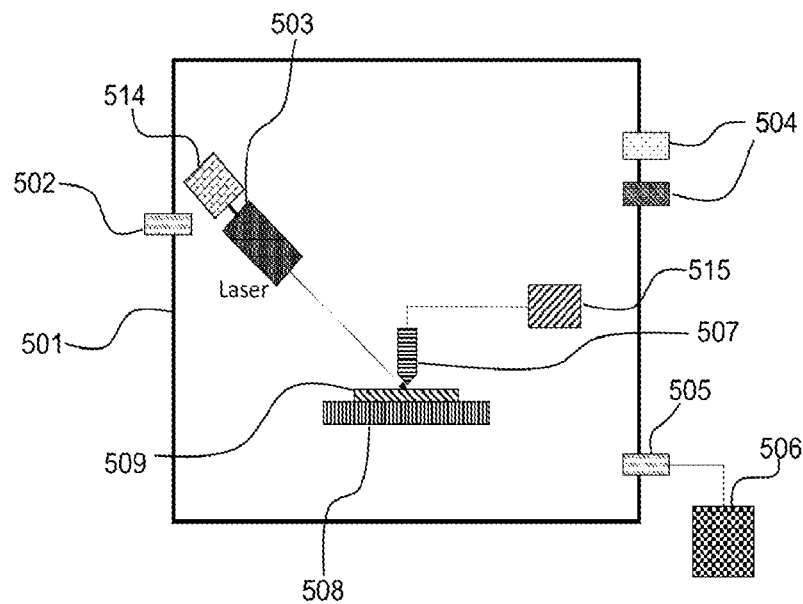
FIG. 5 is a schematic illustration of the integrated synthesis-characterization unit according to an alternative embodiment of the present invention.
Figure 6:
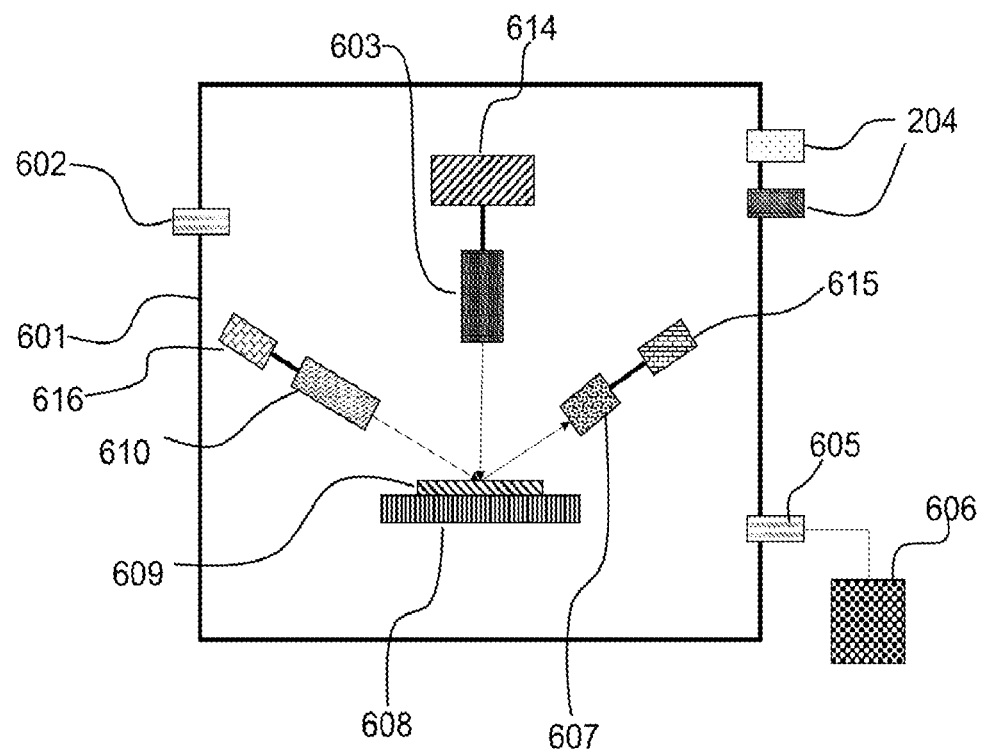
FIG. 6 is a schematic illustration of the integrated synthesis-characterization unit according to an alternative embodiment of the present invention.

In other embodiments, in the integrated synthesis-characterization unit, the discrete heat treatment of the micro-scale or serially-synthesized samples in the high-throughput experimental samples library and the tracking and characterization of the samples under heat treatment may be as shown in FIG. 5 and FIG. 6: the sample holder (508 and 608) is fixed; the micro-heating source (503 and 603), the excitation source (610) and the signal collector (507 and 607), controlled by the micro-heating source X-Y plane tracking controller (514 and 614), excitation source X-Y plane tracking controller (616) and signal collector X-Y plane tracking controller (515 and 615) respectively, align with a point in the plane of the high-throughput experimental sample (209, 309 and 409), and meanwhile complete the scanning of the whole plane of the high-throughput experimental sample.

Specifically, in the integrated synthesis-characterization unit, a feedback control loop is provided between the signal collector (207, 307, 407, 507 and 607) and the micro-heating source (203, 303, 403, 503 and 603) for quick feedback and control of the thermodynamic conditions based on the characterization results through quick identification and automatic determination of characterization data collected by the signal collector.

Preferably, in the integrated synthesis-characterization unit, the chamber may have radiation heating elements or resistance wire- or $MoSi_2$-based atmosphere heating elements, electric and magnetic field sources, etc.

Specifically, in the high-throughput combinatorial materials experimental apparatus for in-situ synthesis and real-time characterization, the high-throughput samples pass through the composition spread device, the low temperature diffusion mixing device and the integrated synthesis-characterization unit using a transfer device such as one or more magnetic drive rods.

Preferably, in the high-throughput combinatorial materials experimental apparatus for in-situ synthesis and real-time characterization, a valve is provided between the composition spread device, the low temperature diffusion mixing device and the integrated synthesis-characterization unit to isolate the vacuum and atmosphere.

Figure 7:
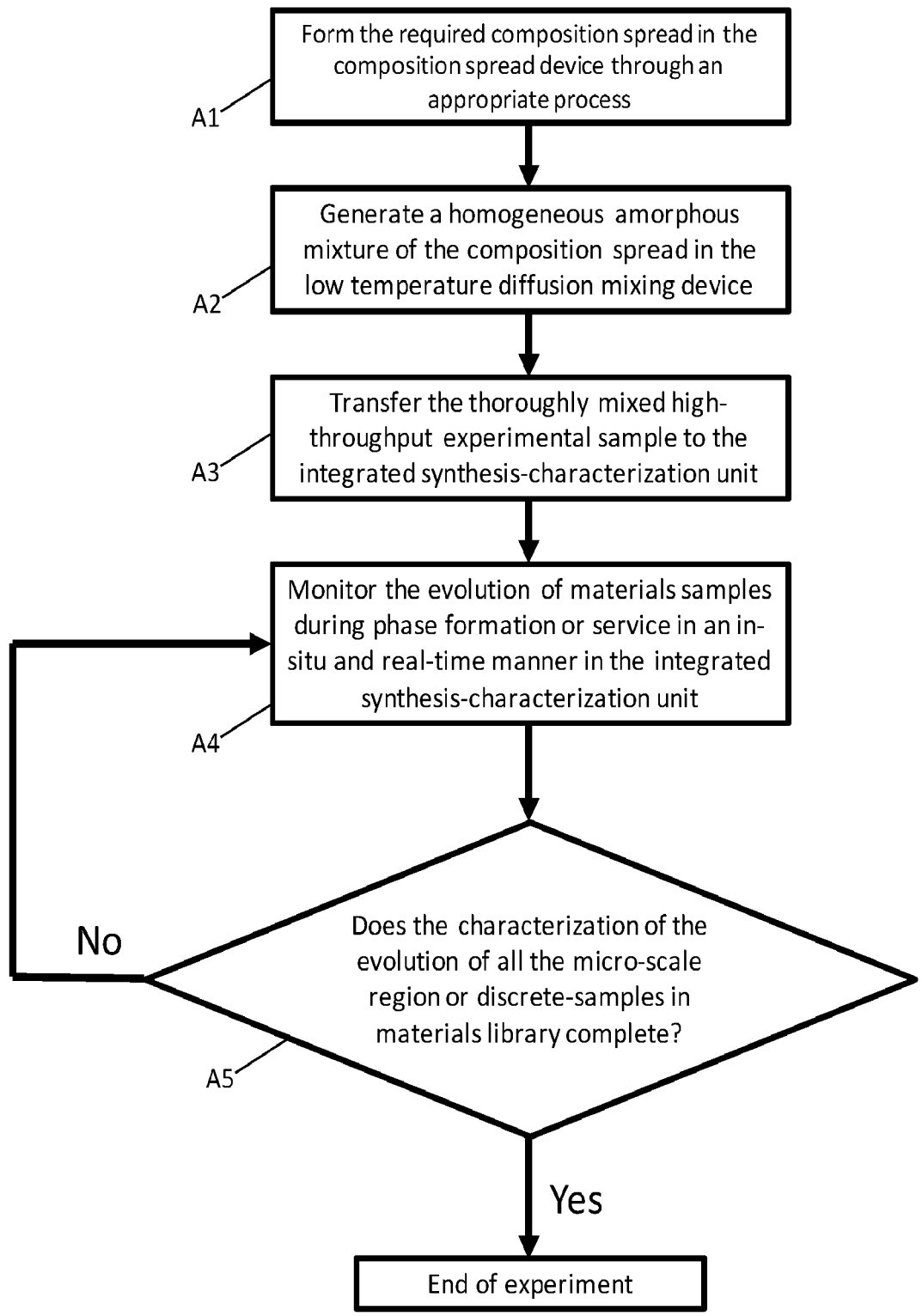
FIG. 7 illustrates a flow chart of a method of using a high-throughput combinatorial materials experimental apparatus for in-situ synthesis and real-time characterization according to another embodiment of the present invention.
Figure 8:
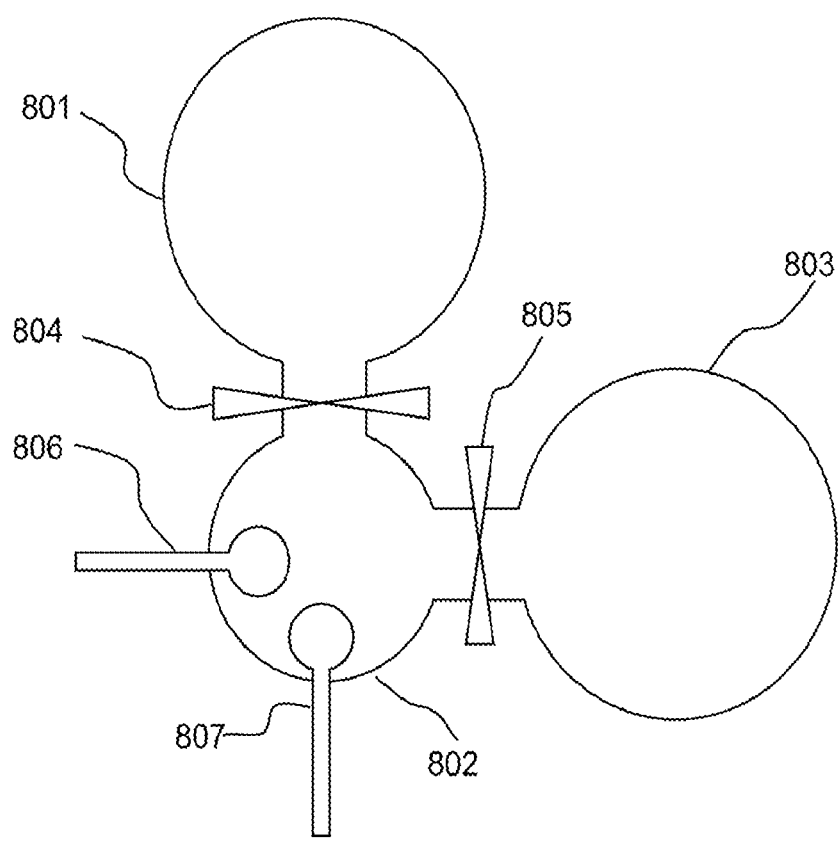
FIG. 8 schematically illustrates the interconnection of the composition spread device, the low temperature diffusion mixing device and the integrated synthesis-characterization unit of the high-throughput combinatorial materials experimental apparatus for in-situ synthesis and real-time characterization according to an embodiment of the present invention.

A method using the high-throughput combinatorial materials experimental apparatus for in-situ synthesis and real-time characterization comprises, as shown in FIG. 7:

Step A1: Form the required composition spread in the composition spread device through an appropriate process based on the design of the high-throughput experiment;

Step A2: Transfer the composition spread samples to the low temperature diffusion device using a transfer device such as a magnetic drive rod, and select an appropriate thermodynamic "temperature/thickness" window according to the diffusion coefficient and thickness of the high-throughput experimental materials samples, so that a vertically homogeneous amorphous mixture is generated through diffusion of the composition spread;

Step A3: Transfer the thoroughly mixed high-throughput experimental sample to the integrated synthesis-characterization unit using a transfer device such as a magnetic drive rod, and adjust the location of the sample holder or the micro-heating source, excitation source and the signal collector to align the micro-heating source, excitation source and the signal collector with one micro-scale or serially-synthesized high-throughput experimental sample;

Step A4: Start the micro-heating source and heat the aligned micro-scale region on the high-throughput experimental sample to serially-synthesize the sample; meanwhile, start the excitation source and the signal collector to detect the evolution of physical and chemical properties or service performance of interest during heat treatment and phase formation; or alternatively, simulate the material service environment using the micro-heating source, electric field source, magnetic field source, MEMS, etc., and start the excitation source and the signal collector to detect the evolution of physical and chemical properties or service performances of interest during service of the material samples; continue to heat the sample and to detect the evolution of physical and chemical properties or service performances of interest until one or several conditions of properties, such as structure, composition, magnetic, optical properties etc., are met.

Step A5: Upon completion of in-situ serial synthesis and real-time characterization of the one sample in Step 4, align the micro-heating source, excitation source and signal collector with another micro-scale or serially-synthesized high-throughput experimental sample and repeat Step 4, until the in-situ serial synthesis and real-time characterization or testing of service environment of all the micro-scale or serially-synthesized high-throughput experimental samples are completed.

Embodiment 1

As shown in FIGS. 8, 801, 802 and 803 are the composition spread device, the low temperature diffusion mixing device, and the integrated synthesis-characterization unit respectively. A first valve 804 is provided between the composition spread device 801 and the low temperature diffusion mixing device 802, and a second valve 805 is provided between the low temperature diffusion mixing device 802 and the integrated synthesis-characterization unit 803. When the first valve 804 is closed, the vacuum and atmosphere in the composition spread device 801 and the low temperature diffusion mixing device 802 are isolated; and when the second valve 805 is closed, the vacuum and atmosphere in the low temperature diffusion mixing device 802 and the integrated synthesis-characterization unit 803 are isolated. After the precursor of the composition spread of the high-throughput experimental samples is formed in the composition spread device 801, the atmosphere, temperature and other thermodynamic conditions in the composition spread device 801 are removed. The first valve 801 is open, and the first magnetic drive rod 807 transfers the precursor of the composition spread of the high-throughput experimental samples from the composition spread device 801 to the low temperature diffusion mixing device 802, and then the first valve 804 is closed. An appropriate thermodynamic "temperature/thickness" window is selected according to the diffusion coefficient and thickness of the high-throughput experimental materials samples, and the low temperature diffusion mixing device 802 creates corresponding thermodynamic conditions to generate a homogeneous amorphous mixture through diffusion of the composition spread samples. Upon the completion of the low temperature diffusion mixing, the atmosphere, temperature and other thermodynamic conditions in the low temperature diffusion mixing device 802 are removed. The second valve 805 is open, and the homogenous amorphous mixture of the high-throughput experimental samples is transferred through the second magnetic drive rod 806 from the low temperature diffusion mixing device 802 to the integrated synthesis-characterization unit 803, and then the second valve 805 is closed. The in-situ serial synthesis and real-time characterization of the homogenous amorphous mixture of the high-throughput experimental samples are performed in the integrated synthesis-characterization unit 803.

In this embodiment, the composition spread device 801 is an ultra-high vacuum and ultra-high precision ion beam sputtering chamber fitted with a continuous ternary phase diagram template. The continuously composition-graded precursor for elements A, B and C in $A_xB_yC_z$ (x+y+z=1) can be generated, thus covering the complete composition spread of $A_xB_yC_z$ compounds or alloys.

In this embodiment, the low temperature diffusion mixing device 802 is a $MoSi_2$-based atmosphere heating chamber, with heating temperature ranging from room temperature to 800° C. and temperature control accuracy of ±3° C. It has both gas inlet and vent paths and can provide diffusion of inert gases (such as He, Ne, Ar, and $N_2$) or reaction gases (such as $O_2$, S, $H_2S$ and $Cl_2$).

Figure 9:
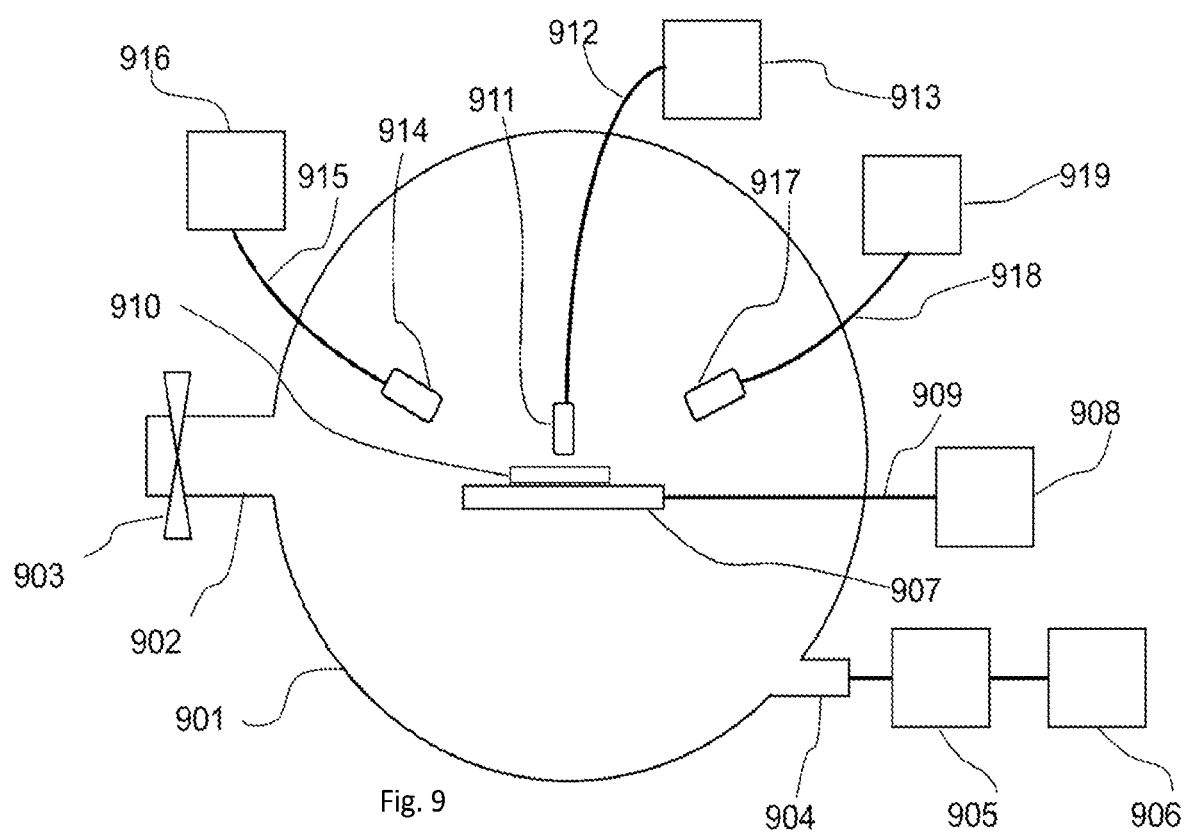
FIG. 9 schematically illustrates the integrated synthesis-characterization unit according to another embodiment of the present invention.

In one embodiment, as shown in FIG. 9, 901 is a chamber of the integrated synthesis-characterization unit; 902 is a channel connecting the integrated synthesis-characterization unit and the low temperature diffusion mixing device; 903 is a valve between the integrated synthesis-characterization unit and the low temperature diffusion mixing device; and 904 is a vent of the chamber 901 connected to a molecular pump 905 and a mechanical pump 906 outside the chamber 901 to provide the desired experimental vacuum atmosphere.

In this embodiment, the micro-heating source of the integrated synthesis-characterization unit is laser. 911 is a laser emitting port, connected to a pulsed laser driver 913 through an optical fiber 912. The pulsed laser driver 913 can provide pulsed laser with tunable power and duty cycle and power range of 40 mW to 125 mW.

In this embodiment, the excitation source is laser, comprising a laser emitting port 914, an optical fiber 915 and a laser generator 916. The excitation laser has a power of 1 mW and a different wavelength from the micro-heating pulsed laser.

In this embodiment, the signal collector utilizes a laser power meter 917, connected to a data acquisition and processing system 919 through an optical fiber 918. The data acquisition and processing system 919 determines the reflectivity of the sample against the excitation laser by comparing the power of the excitation laser with that of the sample reflected laser measured by the laser power meter 917.

The micro-heating laser emitting port 911, excitation laser emitting port 914 and laser power meter 917 are fixed and align with a point in the plane of samples 910. Under the action of the micro-heating laser, the temperature of the sample at this point gradually increases, and the heating temperature can be calculated according to the duty cycle and power of the tunable pulsed laser emitted from the micro-heating laser emitting port 911 and the convection and radiation heat transfer efficiency of the sample, material heat capacity, and phase transition enthalpy. When the micro-heating pulsed laser is in a non-pulse cycle, the data acquisition and processing system 919 determines the reflectivity of the samples at the current temperature by comparing the power of the excitation laser with the laser power measured by the laser power meter 917.

Generally, the heating procedure for the micro-heating source can be set according to the experimental design. In this embodiment, a feedback control loop is provided between the data acquisition and processing system 919 and the pulsed laser driver 913, and the power and duty cycle of the output pulsed laser of the pulsed laser driver 913 can be tuned according to the reflectivity feedback of the samples, thus achieving the control over the heat treatment temperature and heating rate.

In this embodiment, a sample holder 907 is connected to a 2D displacement controller 908 through a drive rod 909. The 2D displacement controller 908 controls the movement of the sample holder 907 in the X-Y plane to make the micro-scale or serially-synthesized high-throughput experimental samples sequentially align with the point with which the micro-heating laser emitting port 911, excitation laser emitting port 914 and laser power meter 917 align, thus characterizing the evolution of the reflectivity of each micro-scale or serially-synthesized sample as the thermodynamic conditions change.

In this embodiment, a method of using the high-throughput combinatorial materials experimental apparatus for in-situ synthesis and real-time characterization comprises:

Step B1: Form continuously composition-graded precursor of $A_xB_yC_z$ (x+y+z=1) in the ultra-high vacuum and ultra-high precision ion beam sputtering chamber fitted with a continuous ternary phase diagram template according to the high-throughput experimental design;

Step B2: Transfer the precursor sample of the composition spread of $A_xB_yC_z$ (x+y+z=1) to the low temperature diffusion mixing device 802 through the first magnetic drive rod 807, and select an appropriate thermodynamic "temperature/thickness" window according to the diffusion coefficient and thickness of the high-throughput experimental materials samples, so that a homogeneous amorphous mixture is generated through diffusion of the composition spread sample;

Step B3: Transfer the high-throughput experimental samples thoroughly mixed through low temperature diffusion into the integrated synthesis-characterization unit 803 through the second magnetic drive rod 806, and adjust the location of the micro-heating pulsed laser emitting port 911, excitation laser emitting port 914 and laser power meter 917 to make each micro-scale or serially-synthesized high-throughput experimental sample sequentially align with a point in the plane of high-throughput experimental sample 910 with which the micro-heating source, excitation source and signal collector align, and then move the sample holder 907 to make a micro-scale or serially-synthesized high-throughput experimental sample move to this point;

Step B4: Start the pulsed laser driver 913 and heat the aligned micro-scale or serially-synthesized high-throughput experimental sample; meanwhile, start the laser generator 916, laser power meter 917 and the data acquisition and processing system 919 to detect the evolution of the reflectivity of the samples under heat treatment; in this step, according to the feedback from the data acquisition and processing system 919, the pulsed laser driver automatically adjusts the power and duty cycle of the micro-heating laser in a real-time manner, thus achieving the desired heat treatment temperature and heating rate; the synthesis process will stop when reflectivity of the sample detected by laser power 917 changes clearly;

Step B5: Upon the completion of characterization of the evolution of the reflectivity of the sample in step 4, use the 2D displacement controller 908 to control the sample holder 907 and make another micro-scale or serially-synthesized high-throughput experimental sample move to the point with which the micro-heating laser emitting port 911, excitation laser emitting port 914 and laser power meter 917 align, and then repeat step 4, until the characterization of the evolution of the reflectivity of all the micro-scale or serially-synthesized high-throughput experimental samples are completed.

Embodiment 2

The second embodiment is generally similar to the first embodiment, but utilizes X-ray diffraction and fluorescence spectroscopy for in-situ synthesis and real-time characterization of the evolution of the composition and phase of materials, which further shows the universality of the present invention in materials science research.

Figure 10:
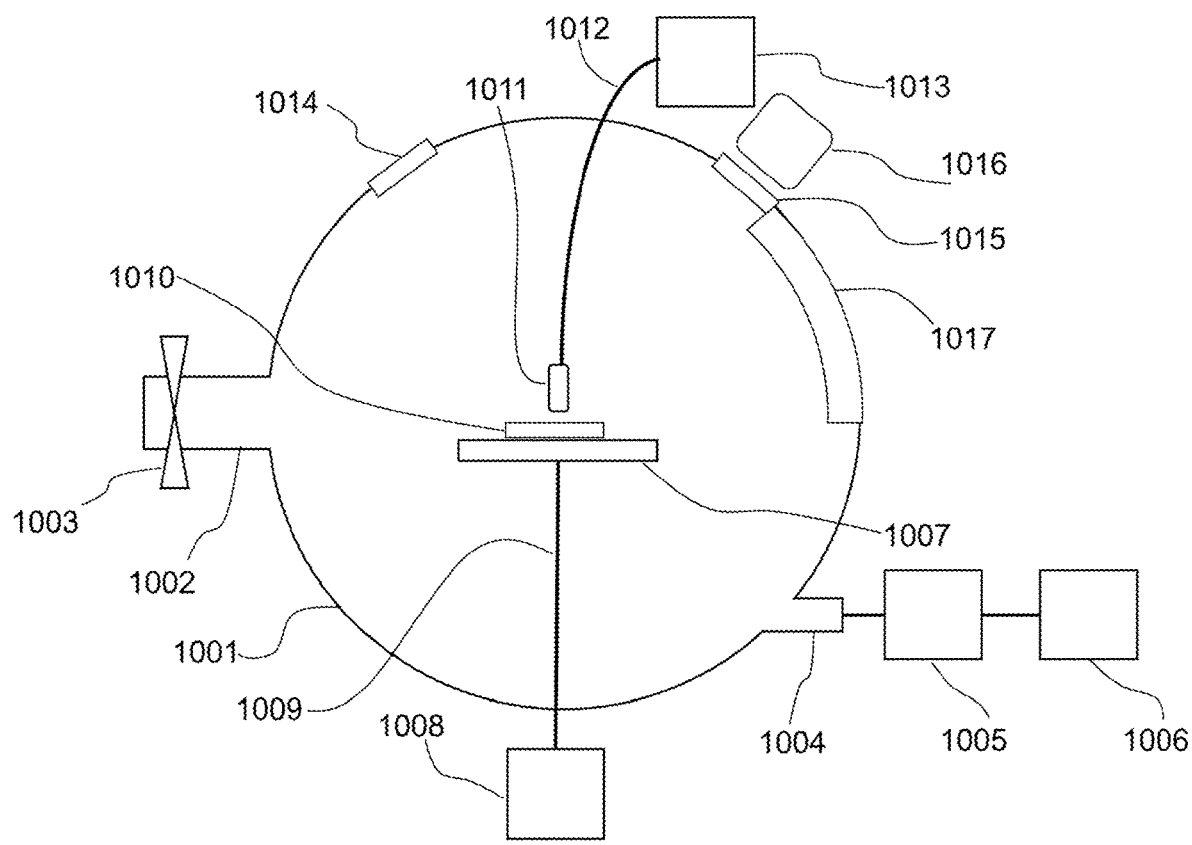
FIG. 10 schematically illustrates the integrated synthesis-characterization unit according to another embodiment of the present invention.

The differences between this embodiment and the first embodiment mainly lie in the excitation source, signal collector, sample holder and the control system of the integrated synthesis-characterization unit of the in-situ synthesis and real-time characterization high-throughput combinatorial materials experimental apparatus, as shown in FIG. 10.

In this embodiment, the excitation source is continuous spectrum white light hard X-ray generated from a synchrotron radiation source. The white light hard X-ray is introduced through an X-ray entrance window 1014 in the chamber 1001 and is incident at a point in the plane of sample 1010.

In this embodiment, the signal collector comprises an energy-resolved detector 1016 and a 1D position-resolved X-ray detector 1017 to characterize the evolution of the composition and phase of single crystalline and polycrystalline samples respectively. The energy-resolved detector may be a Si (Li) solid state detector, high-purity Ge solid state detector, GaAs solid state detector, CdTe solid state detector or CdZnTe solid state detector. The 1D position-resolved X-ray detector may be a Si microstrip detector, gas detector, phase plate, charge-coupled detector, pixel array detector, or photosensitive wire type XBPM.

In this embodiment, the 1D position-resolved X-ray detector 1017 is located on the inner wall of the chamber 1001, and the energy-resolved detector 1016 is located outside the chamber 1001. An X-ray exit window 1015 is provided on the chamber 1001 at the location in alignment with the energy-resolved detector 1016.

In this embodiment, the X-ray entrance window 1014 and the X-ray exit window 1015 are made of beryllium.

In this embodiment, the sample holder displacement controller 1008 is a 3D displacement and rotation controller. It can move the sample holder 1007 in a two-dimensional motion in the X-Y plane of the sample 1010 to achieve the in-situ and real-time experimental study of each micro-scale or serially-synthesized high-throughput experimental sample. It can also adjust the position of the high-throughput experimental sample 1010 in the Z direction perpendicular to the plane, and make the sample holder rotate along the Z direction, so as to find out the best diffraction angle and distinguish the white light X-ray diffraction signals from the X-ray fluorescence signals.

In this embodiment, of course, both of the energy-resolved detector 1016 and the 1D position-resolved X-ray detector 1017 are connected to a data acquisition and processing system, and there is a feedback control loop between the data acquisition and processing system and the pulsed laser driver 1013, which can tune the micro-heating pulsed laser based on the judgment of the evolution of the composition and phase of materials samples. Moreover, the incident hard X-ray and the micro-heating pulsed laser should align with a point in the plane of the high-throughput experimental sample 1010.

The differences of the method of using the high-throughput combinatorial materials experimental apparatus for in-situ synthesis and real-time characterization in this embodiment from that in the first embodiment are described as follows.

Prior to the in-situ serial synthesis and real-time characterization experiment, the detector is selected according to the crystal type of the sample. If the sample is polycrystalline, the X-ray diffraction and fluorescence signals can be collected through the energy-resolved detector. If the sample is single crystalline, the X-ray diffraction signals can be collected through the 1D position-resolved X-ray detector, and the X-ray fluorescence signals can be collected through the energy-resolved detector. When conditions allow, both detectors can be kept on for real-time collection and analysis of the signals collected by them.

Prior to the start of the pulsed laser driver to heat the material sample, the hard X-ray incident path and detectors 1016 and 1017 can be started. The sample holder 1007 rotates along the Z direction driven by the controller 1008 to seek for the best experimental angle of the high-throughput experimental sample 1010 and the incident hard X-ray.

It will be apparent to those skilled in the art that various modification and variations can be made in the high-throughput combinatorial materials experimental apparatus for in-situ synthesis and real-time characterization and related methods of the present invention without departing from the spirit or scope of the invention. Thus, it is intended that the present invention cover modifications and variations that come within the scope of the appended claims and their equivalents.

What is claimed is:

1. A high-throughput combinatorial materials experimental apparatus for in-situ synthesis and real-time characterization, comprising:
   a composition spread device for preparing a continuously graded or discrete composition spread containing a plurality of samples located at a plurality of locations on a plane;
   a low temperature diffusion mixing device for mixing the composition spread in a direction perpendicular to the plane by diffusion at a predetermined temperature to form an amorphous mixture; and
   an integrated synthesis-characterization unit for heat treatment of the samples of the composition spread in a parallel or point-by-point scanning mode at different thermodynamic conditions for phase formation, while characterizing properties of the samples in an in-situ and real-time manner,
   wherein the composition spread device, the low temperature diffusion mixing device and the integrated synthesis-characterization unit are separate units and are connected in series, and wherein the apparatus further comprises a sample transfer device for transferring the composition spread sequentially from the composition spread device to the low temperature diffusion mixing device and from the low temperature diffusion mixing device to the integrated synthesis-characterization unit.

2. The apparatus according to claim 1, wherein the low temperature diffusion mixing device includes radiation heating elements, resistance wire, $MoSi_2$-based atmosphere heating elements, or electric or magnetic field sources.

3. The apparatus according to claim 1, wherein the integrated synthesis-characterization unit comprises:
a chamber;
a sample holder disposed in the chamber for holding the composition spread;
a micro-heating source for heating a selected sample at a selected location of the composition spread located in the chamber;
an excitation source for providing excitation to the selected sample while the selected sample is being heated;
a signal collector for collecting characterization signals generated by the selected sample while the selected sample is heated and excited;
wherein the sample holder, the micro-heating source, the excitation source and the signal collector are controlled to cooperate with each other to achieve discrete heat treatment of each sample individually and the plurality of samples sequentially for phase formation and to collect and record characterization signals from each sample while under heat treatment.

4. The apparatus according to claim 3, wherein the micro-heating source includes a laser heating source or an electron beam heating source.

5. The apparatus according to claim 3, wherein the micro-heating source includes a tunable pulsed laser source and a controller, and
wherein the controller calculates a sample heating temperature of the selected sample by the micro-heating source based on a duty cycle, a power density, a spot size of the tunable pulsed laser and a convection efficiency, a radiation heat transfer efficiency of the sample, a material heat capacity, and a phase transition enthalpy of the selected sample, or obtains the sample heating temperature of the selected sample using an infrared temperature measuring device.

6. The apparatus according to claim 3, wherein the excitation source includes one of a microwave, a THz wave, an infrared light, a visible light, an ultraviolet light, a deep ultraviolet light, a soft X-ray, electron, spallation neutron, and a synchrotron radiation source.

7. The apparatus according to claim 3, wherein the signal collector includes one of a Raman spectrometer, a neutron detector, an energy-resolved X-ray counter, a wavelength-resolved X-ray counter, and a fluorescence spectrometer.

8. The apparatus according to claim 3, wherein the signal collector and the micro-heating source form a feedback control loop for real-time feedback and control of thermodynamic conditions of the selected sample based on the characterization signals collected by the signal collector.

9. A method for in-situ synthesis and real-time characterization using the apparatus according to claim 3, the method comprising:
Step 1: Forming a composition spread in the composition spread device based on a predetermined material design, the composition spread containing a plurality of samples located at a plurality of locations on a plane;
Step 2: Transferring the composition spread from the composition spread device to the low temperature diffusion mixing device using the sample transfer device, selecting a thermodynamic temperature/thickness window according to a diffusion coefficient and a thickness of the samples, and heating the composition spread based on the selected thermodynamic temperature/thickness window to form a homogeneous amorphous mixture of the composition spread through diffusion;
Step 3: Transferring the composition spread from the low temperature diffusion mixing device to the integrated synthesis-characterization unit using the sample transfer device, and adjusting a location of the sample holder and/or the micro-heating source, the excitation source and the signal collector to align the micro-heating source, the excitation source and the signal collector with a selected one of the plurality of samples of the composition spread;
Step 4: Operating the micro-heating source to heat the selected sample while operating the excitation source and the signal collector to detect an evolution of one or more properties of the selected sample during heat treatment and phase formation, the one or more properties including one or more of physical and chemical properties, and continuing to operate the micro-heating source, the excitation source and the signal collector until one or more predetermined conditions of the selected sample are met; and
Step 5: After the one or more predetermined conditions of the selected sample are met, re-aligning the micro-heating source, the excitation source and the signal collector with another selected one of the plurality of samples and repeating Step 4, until all of the plurality of samples are processed.

10. The apparatus according to claim 3, wherein the integrated synthesis-characterization unit further comprises:
a gas inlet and a vent provided on the chamber, and a vacuum pump connected to the vent for producing a designed vacuum and atmosphere in the chamber; and
a chamber instrument module for monitoring the vacuum and atmosphere in the chamber.

11. A high-throughput combinatorial materials experimental apparatus for in-situ synthesis and real-time characterization, comprising:
a composition spread device for preparing a continuously graded or discrete composition spread containing a plurality of samples located at a plurality of locations on a plane;
a low temperature diffusion mixing device for mixing the composition spread in a direction perpendicular to the plane by diffusion at a predetermined temperature to form an amorphous mixture; and
an integrated synthesis-characterization unit for heat treatment of the samples of the composition spread in a parallel or point-by-point scanning mode at different thermodynamic conditions for phase formation, while characterizing properties of the samples in an in-situ and real-time manner,
wherein the integrated synthesis-characterization unit comprises:
a chamber;
a sample holder disposed in the chamber for holding the composition spread;
a micro-heating source for heating a selected sample at a selected location of the composition spread located in the chamber;
an excitation source for providing excitation to the selected sample while the selected sample is being heated;

a signal collector for collecting characterization signals generated by the selected sample while the selected sample is heated and excited;

wherein the sample holder, the micro-heating source, the excitation source and the signal collector are controlled to cooperate with each other to achieve discrete heat treatment of each sample individually and the plurality of samples sequentially for phase formation and to collect and record characterization signals from each sample while under heat treatment, wherein the sample holder includes a displacement platform which provides controllable movements in at least two directions in the plane of the samples, and wherein the micro-heating source, the excitation source and the signal collector align with a point in the plane of the samples placed on the sample holder.

12. The apparatus according to claim 11, wherein the integrated synthesis-characterization unit further comprises:

a gas inlet and a vent provided on the chamber, and a vacuum pump connected to the vent for producing a designed vacuum and atmosphere in the chamber; and a chamber instrument module for monitoring the vacuum and atmosphere in the chamber.

13. A high-throughput combinatorial materials experimental apparatus for in-situ synthesis and real-time characterization, comprising:

a composition spread device for preparing a continuously graded or discrete composition spread containing a plurality of samples located at a plurality of locations on a plane;

a low temperature diffusion mixing device for mixing the composition spread in a direction perpendicular to the plane by diffusion at a predetermined temperature to form an amorphous mixture; and an integrated synthesis-characterization unit for heat treatment of the samples of the composition spread in a parallel or point-by-point scanning mode at different thermodynamic conditions for phase formation, while characterizing properties of the samples in an in-situ and real-time manner, wherein the integrated synthesis-characterization unit comprises:

a chamber;

a sample holder disposed in the chamber for holding the composition spread;

a micro-heating source for heating a selected sample at a selected location of the composition spread located in the chamber;

an excitation source for providing excitation to the selected sample while the selected sample is being heated;

a signal collector for collecting characterization signals generated by the selected sample while the selected sample is heated and excited;

wherein the sample holder, the micro-heating source, the excitation source and the signal collector are controlled to cooperate with each other to achieve discrete heat treatment of each sample individually and the plurality of samples sequentially for phase formation and to collect and record characterization signals from each sample while under heat treatment, wherein the sample holder is stationary, wherein the apparatus further comprises a micro-heating source tracking controller, an excitation source tracking controller and a signal collector tracking controller for respectively controlling alignment of the micro-heating source, the excitation source and the signal collector to simultaneously align at a selected location in the plane of the samples and to move the selected location sequentially to scan all samples of the composition spread.

14. The apparatus according to claim 13, wherein the integrated synthesis-characterization unit further comprises:

a gas inlet and a vent provided on the chamber, and a vacuum pump connected to the vent for producing a designed vacuum and atmosphere in the chamber; and a chamber instrument module for monitoring the vacuum and atmosphere in the chamber.

* * * * *